United States Patent [19]

Tassie

[11] Patent Number: 4,635,529
[45] Date of Patent: Jan. 13, 1987

[54] SEAL ASSEMBLY

[75] Inventor: Douglas P. Tassie, St. George, Vt.

[73] Assignee: General Electric Company, Burlington, Vt.

[21] Appl. No.: 685,266

[22] Filed: Dec. 21, 1984

[51] Int. Cl.⁴ .............................................. F41H 5/20
[52] U.S. Cl. .................................... 89/36.14; 89/41.14
[58] Field of Search ................. 89/1.802, 1.815, 36.13, 89/36.14, 37.02, 37.16, 41.14

[56] References Cited

U.S. PATENT DOCUMENTS

| | | | |
|---|---|---|---|
| 2,580,804 | 1/1952 | Madland | 20/21 |
| 2,733,487 | 2/1956 | Hauck | 20/70 |
| 3,008,380 | 11/1961 | Cowley | 89/37.16 |
| 3,768,422 | 10/1973 | Shaver et al. | 105/409 |
| 3,894,371 | 7/1975 | Yamaha | 52/209 |
| 4,040,333 | 8/1977 | Slysh | 89/37.16 |
| 4,179,978 | 12/1979 | Kirkpatrick et al. | 89/12 |
| 4,280,394 | 7/1981 | Singenberger et al. | 89/37.02 |
| 4,437,384 | 3/1984 | Tassie | 89/37.02 |

Primary Examiner—Stephen C. Bentley
Attorney, Agent, or Firm—Bailin L. Kuch

[57] ABSTRACT

This invention provides an enclosure for a naval gun turret having static seals around the access covers and dynamic seals around the gun barrel slot closure, which seals capture and drain off to a sump any leakage within the interfaces or joints of the main body with the covers and the closure to preclude entrance of wind driven rain or seawater into the interior of the enclosure.

4 Claims, 19 Drawing Figures

SEAL ASSEMBLY

BACKGROUND OF THE INVENTION

1. Field of the Invention

This invention relates to a water trapping seal assembly for an enclosure particularly adapted for use with a naval gun turret.

2. Prior Art

Naval gun turrets are well known, and are shown, for example, in U.S. Pat. No. 4,040,333 issued Aug. 9, 1977 to P. Slysh; in U.S. Pat. No. 4,280,394 issued July 28, 1981 to E. Singenberger et al; and U.S. Pat. No. 4,437,384 issued Mar. 20, 1984 to D. P. Tassie. All shipboard gun turrets are subject to foul weather including rain, wind and greenwater. All points must preclude leakage of water into the interior of the turret. The known naval gun turret solutions involve gaskets, O-rings, and seals with clamped joints. Dynamic seals, i.e., seals between relatively moving parts, require close tolerance slides and fits. Other solutions are suggested in U.S. Pat. No. 3,894,371 issued July 15, 1975 to K. Yamaha; U.S. Pat. No. 2,580,804 issued Jan. 1, 1952 to G. Madland; U.S. Pat. No. 3,768,422 issued Oct. 30, 1973 to W. R. Shaver et al; U.S. Pat. No. 2,733,487 issued Feb. 7, 1956 to T. Hauck.

SUMMARY OF THE INVENTION

It is an object of this invention to provide a seal that may be incorporated into static or dynamic junctions to preclude the entrance of wind driven rain and seawater into the interior of the enclosure.

It is another object of this invention to provide an enclosure for a naval gun turret having static and dynamic sealed junctions which preclude the entrance of wind driven rain or seawater into the interior of the enclosure.

A feature of this invention is the provision of an enclosure for a naval gun turret having static seals around the access covers and dynamic seals around the gun barrel slot closure, which seals capture and drain off to a sump any leakage within the interfaces or joints of the main body with the covers and the closure to preclude entrance of wind driven rain or seawater into the interior of the enclosure.

BRIEF DESCRIPTION OF THE DRAWING

These and other objects, features and advantages of this invention will be apparent from the following specification thereof taken in conjunction with the accompanying drawing in which.

DESCRIPTION OF THE INVENTION

Figure 1:
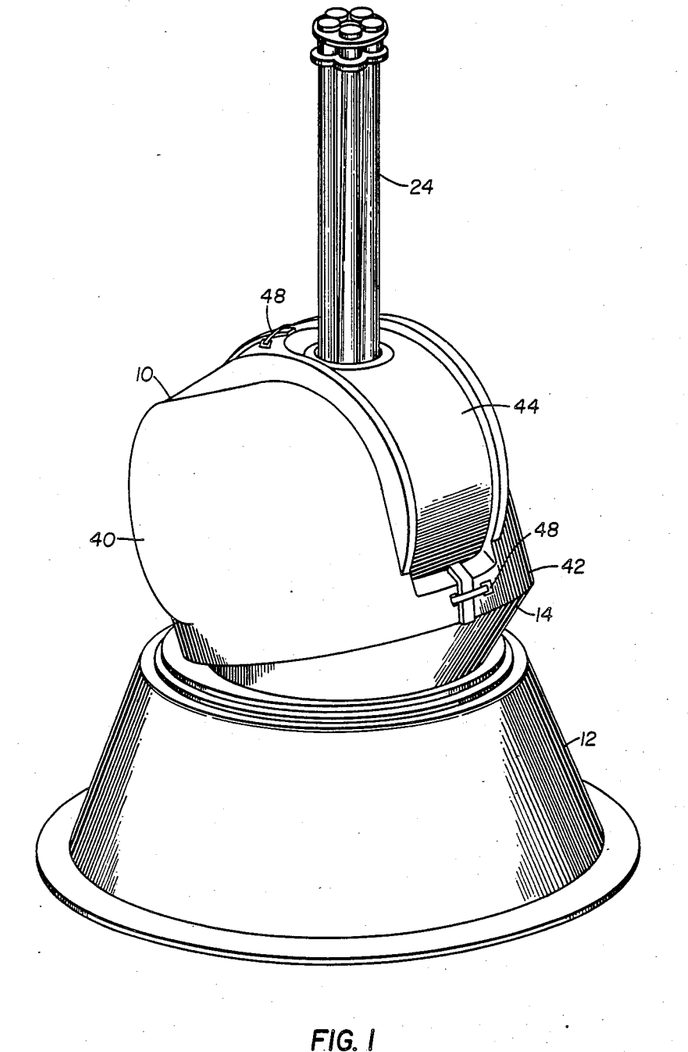
FIG. 1 is a perspective view of a gun turret with an enclosure embodying this invention.
Figure 5:
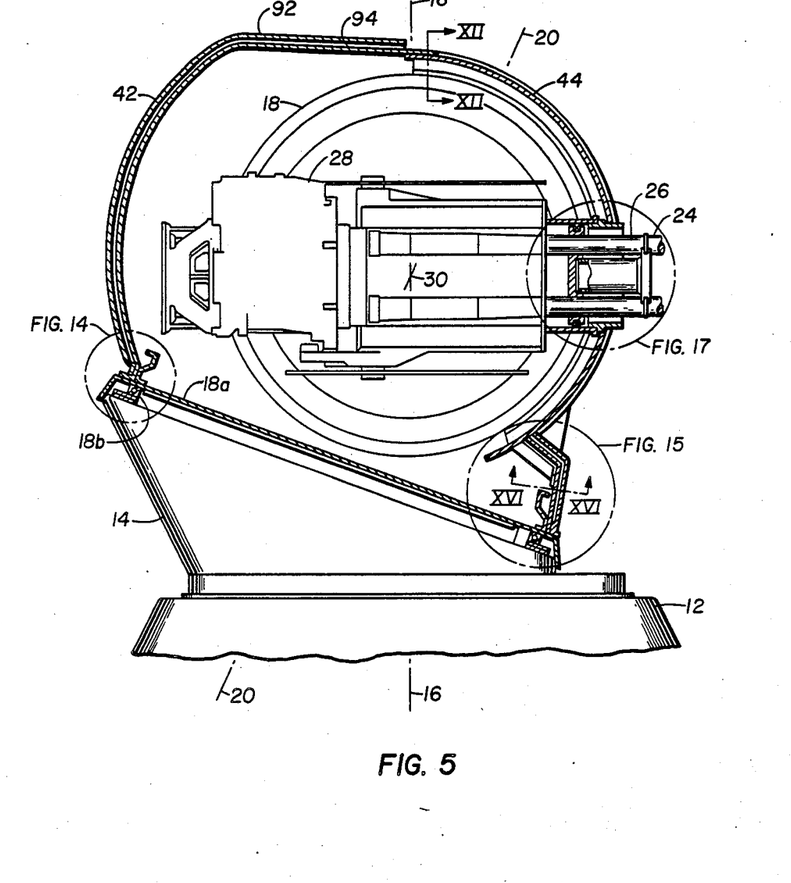
FIG. 5 is a side view in elevation, in partial cross-section, of the enclosure of FIG. 1.

The enclosure 10, shown in FIGS. 1 and 5, is adapted to enclose a naval gun turret such as is shown in U.S. Pat. No. 4,437,384, issued Mar. 20, 1984 to D. P. Tassie. That turret has a base ring 12 which is fixed to the deck of the vessel, and a wedge shaped element 14 whose base is journaled to the top of the base ring 12 for rotation of the element 14 about a first vertical axis 16 which is perpendicular to the top plane of the base ring 12. An elevation ring 18 and skirt 18a are journaled at 18b to the top of the wedge shaped element 14 for rotation about a second vertical axis 20 which is perpendicular to the tilted tip plane of the wedge shaped element 14. A gatling type gun 24 having a rotating barrel cluster 26 and a housing 28 is journaled for pivotal movement about a horizontal axis 30 which is perpendicular to the intersection of the first and second vertical axes 16 and 20. This common intersection of the three axes is located at the center of mass of the gun.

Figure 2:
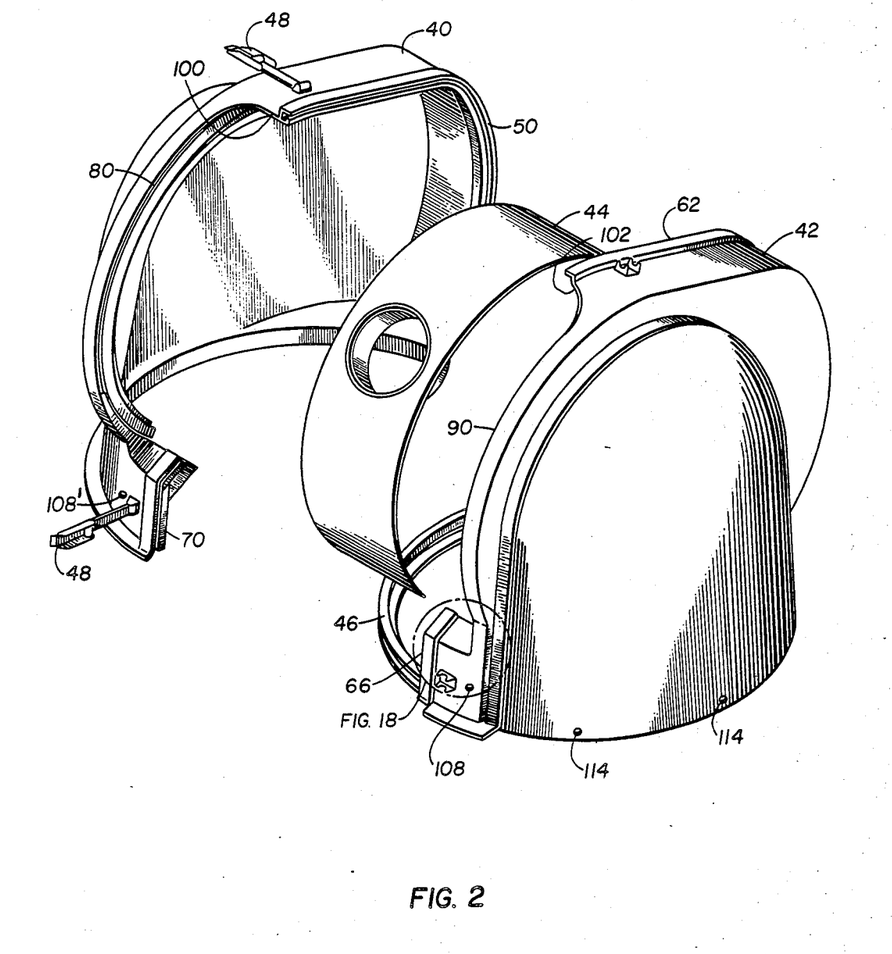
FIG. 2 is an exploded perspective view of the enclosure of FIG. 1.
Figure 3:
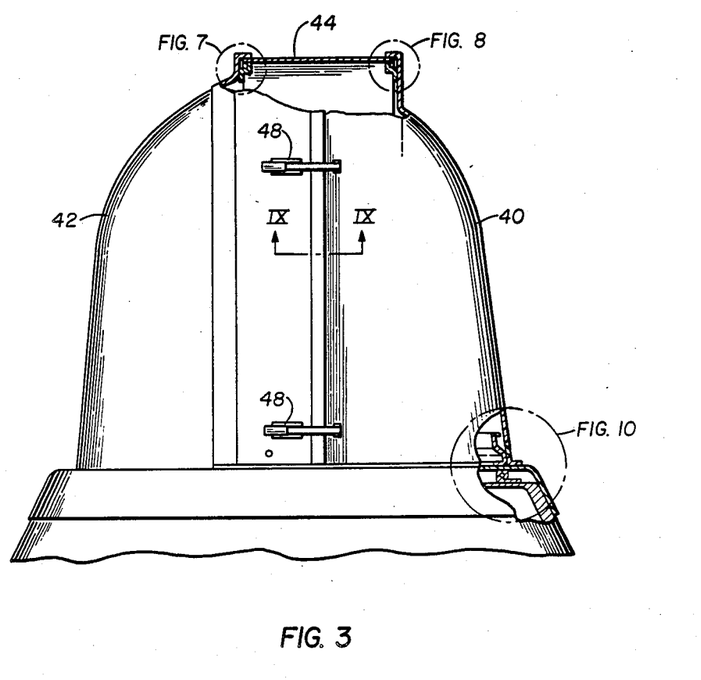
FIG. 3 is an aft view in elevation of the enclosure of FIG. 1.
Figure 4:
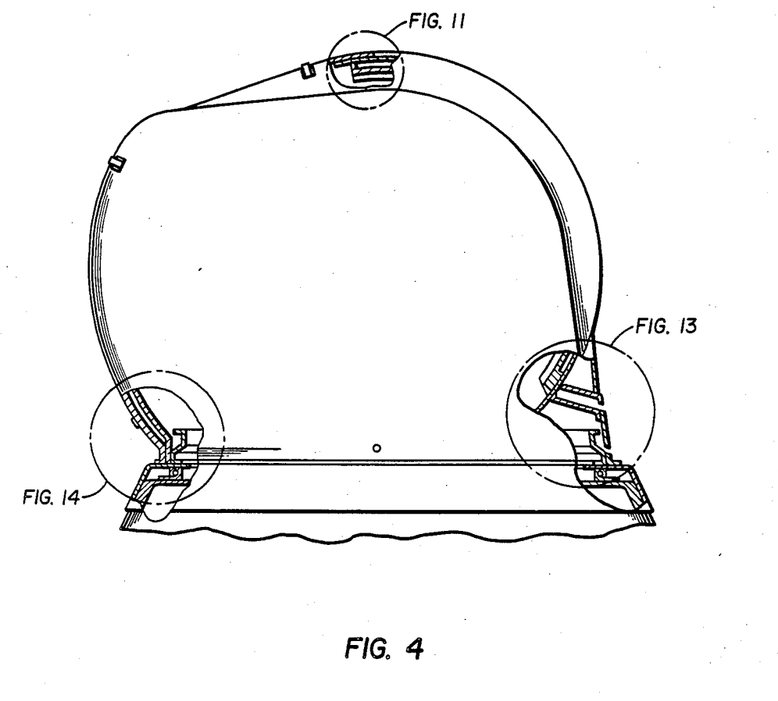
FIG. 4 is a side view in elevation of the enclosure of FIG. 1.

The enclosure 10, as shown in FIGS. 2 and 3, is comprised of three major parts (as viewed from the rear): a right side panel 40, a left side panel 42, and a sliding panel 44. The left panel 42 includes a horizontal base ring 46 which is fixed to the top of the wedge shaped element 14. The right panel 40 is releasably fixed to the left panel 42 by means of a plurality of toggle type hasps 48, here shown as one in the front, one on top, and two in the rear.

Figure 9:
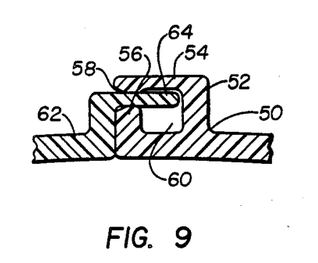
FIG. 9 is a detail in cross-section taken along the plane IX-IX of FIG. 3.
Figure 10:
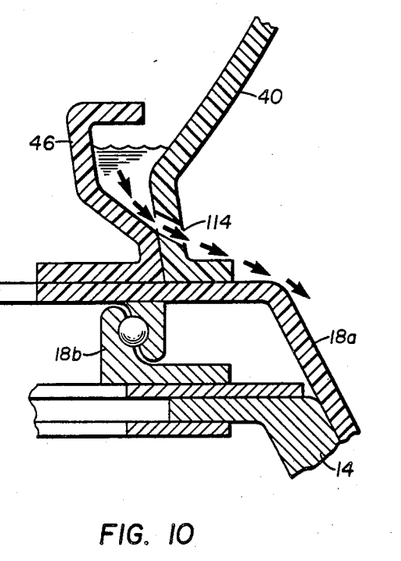
FIG. 10 is a detail in cross-section of FIG. 3.
Figure 16:
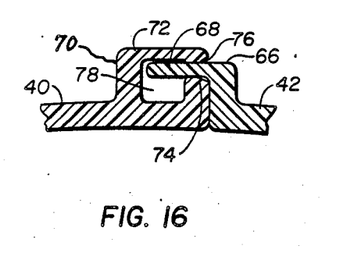
FIG. 16 is a detail in cross-section taken along the plane XVI—XVI of FIG. 5.

The upper and aft margin 50 of the right panel 40, as shown in FIG. 9, has a grooved structure 52 comprised of an outer lip 54 and an inner lip 56 which define an opening 58 and a bore or conduit 60. The upper and aft margin 62 of the left panel 42 has a tongue structure 64 which is received through and closes the opening 58. The lower forward margin 66 of the left panel 42, as shown in FIG. 16, has a tongue structure 68, while the lower forward margin 70 of the right panel 40 has an outer lip 72 and an inner lip 74 which define an opening 76 and a bore or conduit 78. Water entering between the lip 72 and the tongue 68 will pass into the bore 78 which will conduct the water away from the interface of the tongue 68 and the lip 74.

Figure 7:
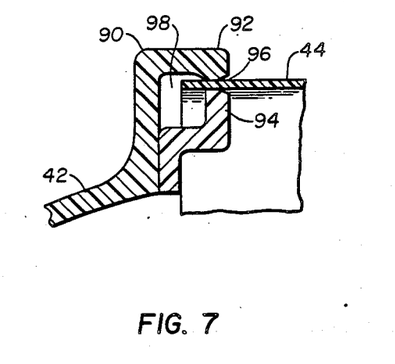
FIG. 7 is a detail in cross-section of FIG. 3.
Figure 8:
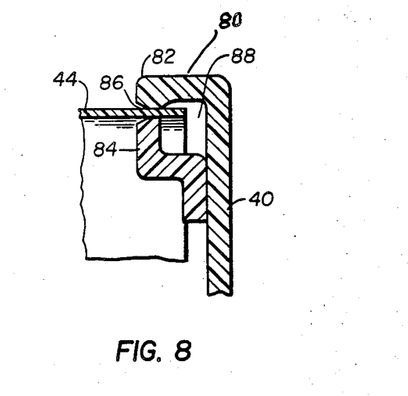
FIG. 8 is a detail in cross-section of FIG. 3.

The upper forward margin 80 of the right panel 40, as shown in FIG. 8, has an outer lip 82 and an inner lip 84 which define an opening 86 and a bore or conduit 88. The upper forward margin 90 of the left panel 42, as shown in FIG. 7, has an outer lip 92 and an inner lip 94 which define an opening 96 and a bore or conduit 98. The right and left margins of the sliding panel 44 are respectively received through and close the right opening 86 and the left opening 96. Water entering between the sliding panel 44 and the lip 82 will pass into the bore 88 which will conduct the water away from the interface of the panel and the lip 84. Water entering between the panel 44 and the lip 92 will pass into the bore 98 which will conduct the water away from the interface of the panel and the lip 94.

Figure 11:
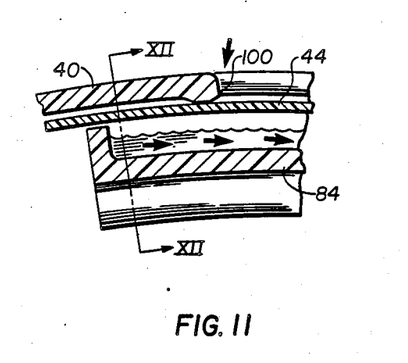
FIG. 11 is a detail in cross-section of FIG. 4.
Figure 12:
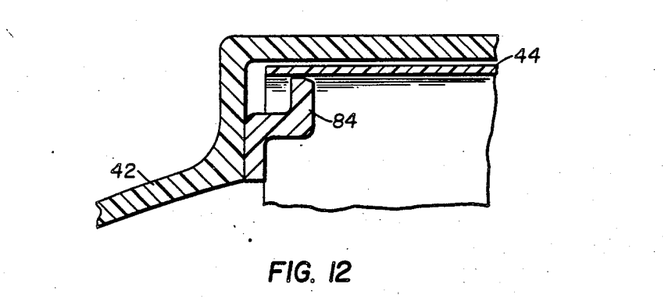
FIG. 12 is a detail in cross-section taken along the plane XII—XII of FIG. 11 and XII—XII of FIG. 5.

The upper margin of the sliding panel 44, as shown in FIG. 11, passes under a lip 100 formed in the right panel 40 and a lip 102 formed in the left panel 42. Any water entering under the lip 102 will pass into either the bore 88 or 98.

Figure 6:
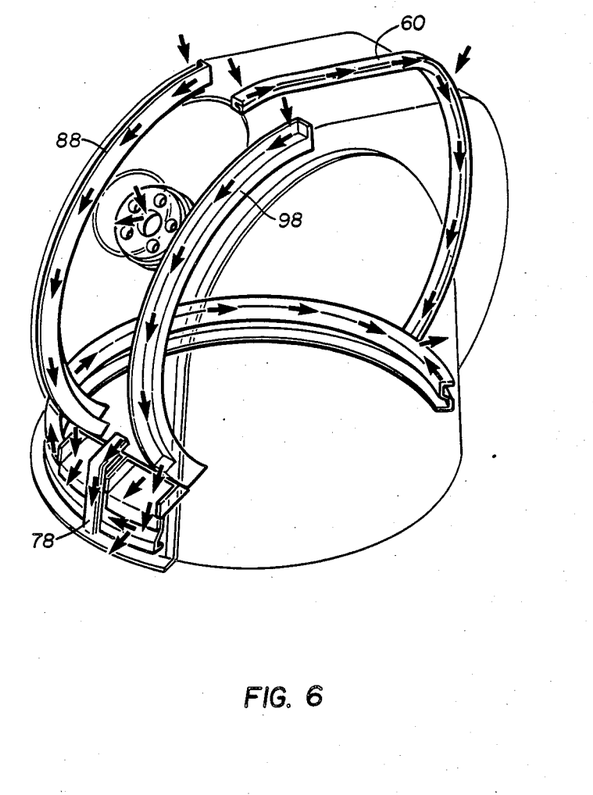
FIG. 6 is a perspective view of the seal system showing the flows of water therethrough.
Figure 13:
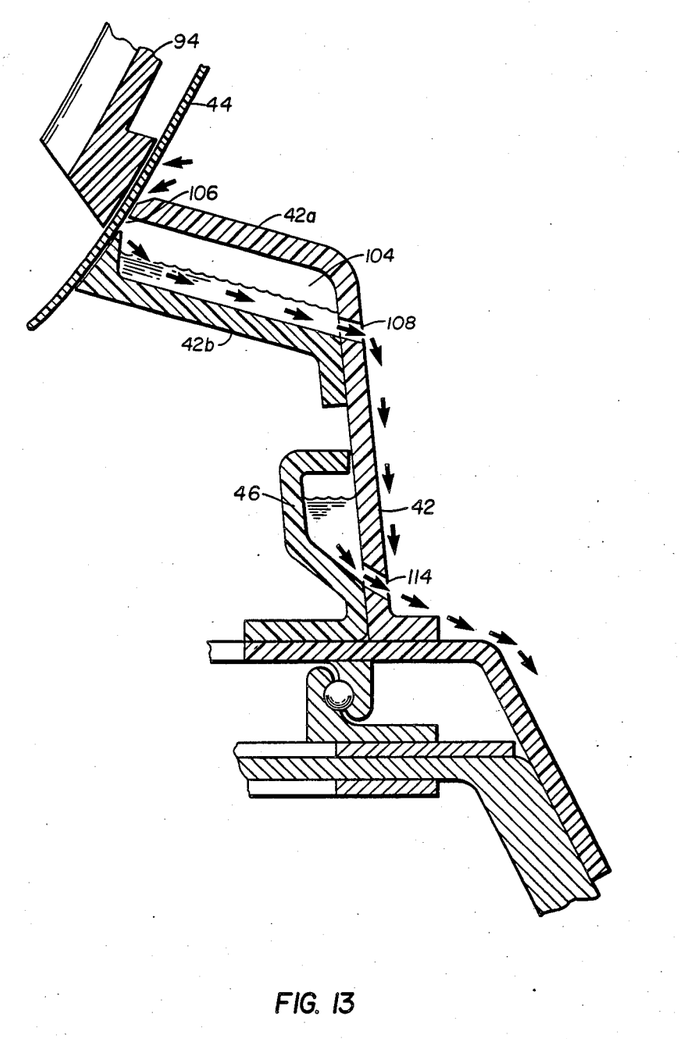
FIG. 13 is a detail in cross-section of FIG. 4.
Figure 19:
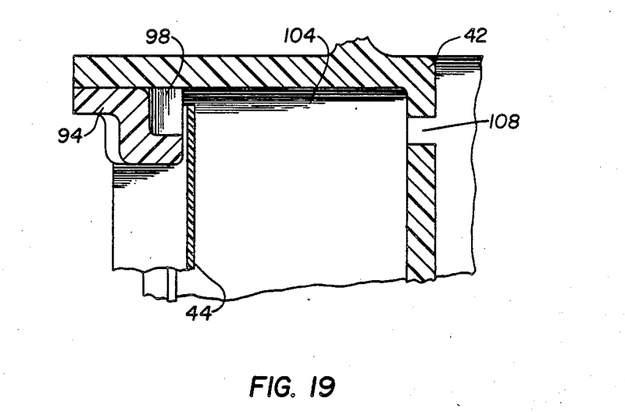
FIG. 19 is a detail in cross-section of FIG. 5.

As shown in FIGS. 2, 6, and 13 the lower forward margins of the right and left panels together form a knee structure. In each panel, (FIG. 13) taking the left panel 42 as exemplary, there is an upper layer 42a and a lower layer 42b, defining a cavity 104 having an open slot 106 closely adjacent the outer surface of the sliding panel 44 and a bore or conduit 108 through the outer wall of the panel 42. Thus any water on the outer surface of the sliding panel 44 which passes the upper lip of the slot 106 provided by the layer 42a should pass through the slot 106 into the cavity 104, which serves as a sump, and pass out of the turret structure through the bore 108. Any water that enters through the bore 108 into the cavity 104 will be trapped in the cavity and pass out again through the bore 108. The bore 98 discharges into the cavity 104, around the edge of the sliding panel 44, as shown in FIG. 19. The bore 88 discharges into the similar cavity in the right panel 40 which has a bore 108$^1$.

Figure 14:
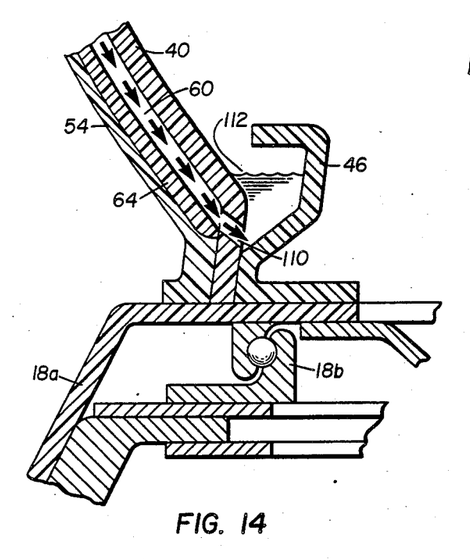
FIG. 14 is a detail in cross-section of FIG. 5.
Figure 15:
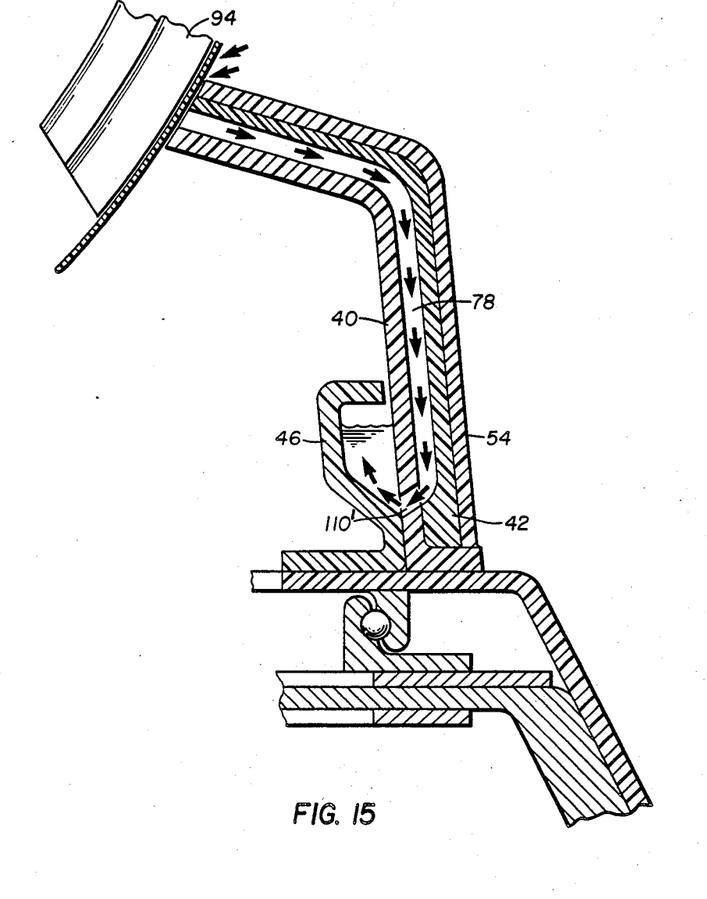
FIG. 15 is a detail in cross-section of FIG. 14.
Figure 17:
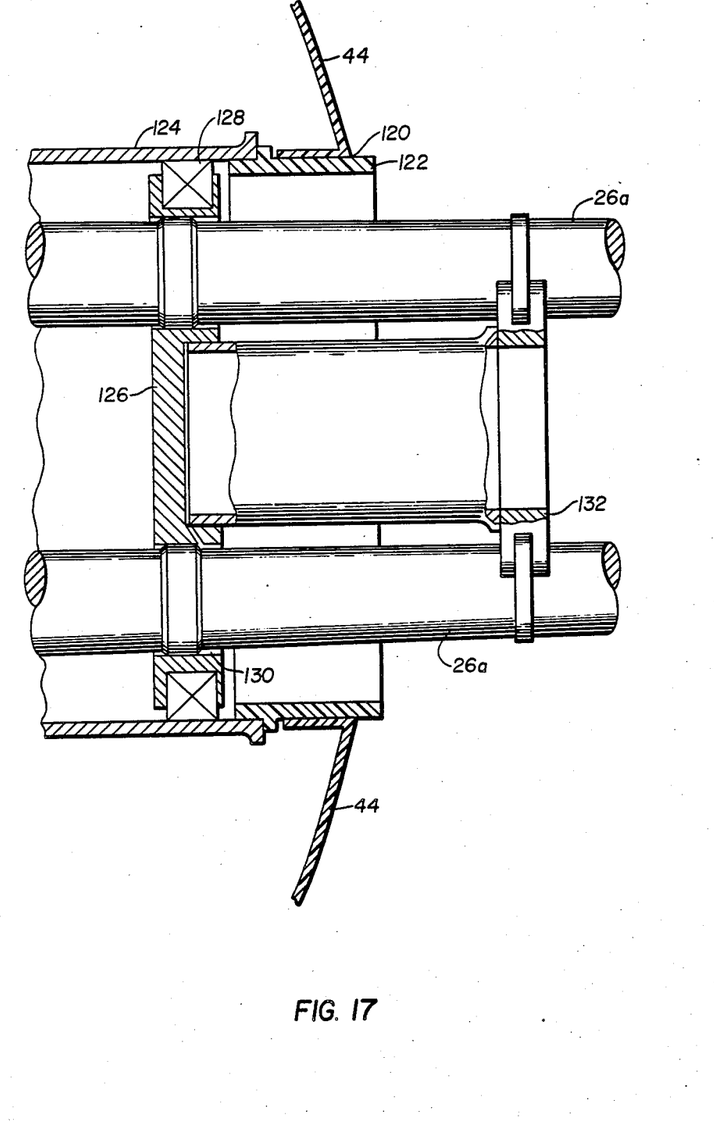
FIG. 17 is a detail in cross-section of FIG. 5.
Figure 18:
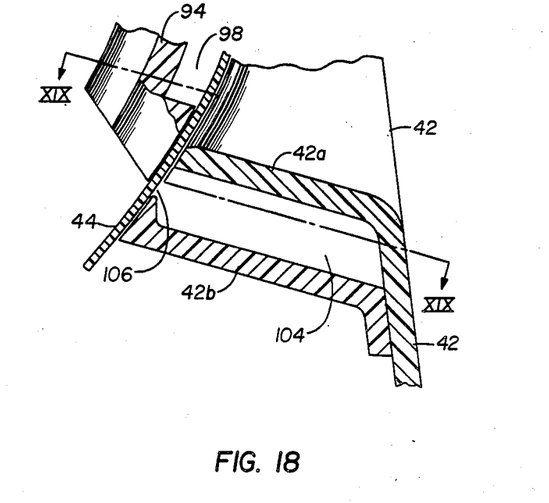
FIG. 18 is a detail in cross-section taken along the plane XVIII—XVIII of FIG. 15.

The bore 60, as shown in FIG. 14, and the bore 78, as shown in FIGS. 17 and 16, discharge water through respective bores 110 and 110$^1$ into a trough 112 which serves as a sump and is defined by the base ring 46 and the inner faces of the panels 40 and 42. A plurality of bores or conduits 114 through the walls of the panels 40 and 42 pass water caught in the trough 112 out of the turret structure. Any water that enters through the bores 114 into the trough will be trapped in the trough and pass out again through the bores 114.

As shown in FIGS. 5 and 17, the sliding panel 44 has an aperture 120 in which is fixed a hub 122. The hub 122 is captured to a hub 124 which is fixed to and carried by the gun housing 28. A circular panel 126 is journaled for rotation on a bearing 128 within the hub 124, and has an annular row of holes 130, each of which receives a closely fitting respective gun barrel 26a. A hub 132 is disposed within the row of gun barrels and is fixed to the hub 126, and in conjunction therewith serves as a clamp for the cluster of gun barrels, broadly of the type shown by R. G. Kirkpatrick et al in U.S. Pat. No. 4,179,978 issued Dec. 25, 1979.

What is claimed is:

1. A naval gun turret comprising
   a first panel,
   a second panel,
   a third sliding panel, and
   a sump having a drain discharging to the exterior of said turret,
   said first and second panels mutually interfitted to provide a static seal having a conduit therein discharging to said sump, and
   said third panel interfitted with said first and second panels respectively to provide respective dynamic seals therewith, each dynamic seal having a respective conduit therein discharging to said sump.

2. A turret according to claim 1 wherein:
   each of said static seals and said respective conduit therein is provided by a tongue formed on one of said first and second panels and a groove formed on the other of said first and second panels.

3. A turret according to claim 1 wherein:
   each of said dynamic seals and said respective conduits therein is provided by a tongue formed on said sliding panel and a groove formed on the respective first and second panel.

4. A turret according to claim 1 further including
   a journal;
   said first panel being mounted on said journal;
   an elevation ring mounted on said first panel;
   a gun mounted on said elevation ring and passing through a sealed to said sliding panel;
   said second panel releasably mounted to said first panel;
   said first and second panels providing a skirt over said journal.

* * * * *